(12) United States Patent
El-Dieb et al.

(10) Patent No.: US 12,168,630 B1
(45) Date of Patent: Dec. 17, 2024

(54) SELF-CURING CONCRETE COMPRISING A METAL-ORGANIC FRAMEWORK AND METHODS OF MAKING THE SAME

(71) Applicant: United Arab Emirates University, Al Ain (AE)

(72) Inventors: Amr El-Dieb, Al Ain (AE); Hilal El-Hassan, Al Ain (AE); Ahmed Alzamly, Al Ain (AE); Lama Allan, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/596,796

(22) Filed: Mar. 6, 2024

(51) Int. Cl.
| | |
|---|---|
| *C04B 24/40* | (2006.01) |
| *C04B 28/04* | (2006.01) |
| *C04B 103/00* | (2006.01) |
| *C04B 103/46* | (2006.01) |

(52) U.S. Cl.
CPC ............ *C04B 24/405* (2013.01); *C04B 28/04* (2013.01); *C04B 2103/0078* (2013.01); *C04B 2103/465* (2013.01)

(58) Field of Classification Search
CPC .................. C04B 24/405; C04B 28/04; C04B 2103/0078; C04B 2103/465
See application file for complete search history.

(56) References Cited

FOREIGN PATENT DOCUMENTS

CN 108821690 A * 11/2018 ............. C04B 28/04

* cited by examiner

*Primary Examiner* — Anthony J Green
(74) *Attorney, Agent, or Firm* — MH2 Technology Law Group, LLP

(57) ABSTRACT

The present disclosure discloses a method of forming self-curing concrete comprising the steps of mixing cement, aggregates, and dry MIL-101(Cr) metal-organic framework (MOF) to form a mixture, incorporating the mixture with water to form wet concrete; and curing the wet concrete. During the curing step, the MIL-101(Cr) MOF adsorbs water to from a surrounding atmosphere. The MIL-101(Cr) MOF is 3-9 wt. % relative to the cement, such that water adsorption by the MIL-101(Cr) MOF enables the wet concrete to self-cure. The present disclosure also discloses a composition for forming concrete, the composition compromising cement, aggregate, water, and MIL-101(Cr) metal-organic framework (MOF), wherein the MIL-101(Cr) is 3-9 wt. % relative to the cement. The present disclosure also discloses a self-curing concrete.

11 Claims, 3 Drawing Sheets

SELF-CURING CONCRETE COMPRISING A METAL-ORGANIC FRAMEWORK AND METHODS OF MAKING THE SAME

FIELD

The present disclosure concerns self-curing concrete. More specifically but not exclusively, the present disclosure concerns self-curing concrete comprising a dry MIL-101(Cr) metal-organic framework.

BACKGROUND

Background description includes information that will be useful in understanding the present invention. It is not an admission that any information provided herein is prior art or relevant to the presently claimed invention or that any publication specifically or implicitly referenced is prior art.

Concrete is the most used construction material worldwide, producing several billion cubic meters annually.

Concrete is cured in the presence of adequate moisture content throughout its early stages to produce the desired properties, as it is significant in improving the concrete microstructure and pore structure and, hence, in developing its performance and durability.

Cement, the main binder in concrete, is not only responsible for the detrimental environmental footprint, but its heat of hydration can also result in evaporating mixing water.

Losing water from concrete mixtures will adversely affect the continuation of cement hydration and produce lower-quality concrete.

Many researchers are investigating different alternatives to minimize the environmental impact of concrete production.

Curing is a typical process in concrete production: shrinkage will occur if curing is not done, and micro-cracks in concrete will be developed due to water loss. The best curing method is an external water source to cool concrete and absorb the heat of hydration. Typically, producing one cubic meter of concrete requires around three cubic meters of water, most of which is for curing.

However, good curing is not always practical in hot weather regions and areas of water inadequacy. In such areas, water may be a scarce resource, and utilizing the scarce water resource is suboptimal and impractical.

In desert regions, water is scarce because of the lack of rain. In those more watered regions, the lack of clean drinking water or the nagging sense of uncertainty about its purity continues to be challenging. Efficiently and ecologically allocating water resources to people and industry remains challenging.

The present disclosure seeks to overcome one or more of the aforementioned problems. More particularly but not exclusively, the present disclosure seeks to provide an improved method for forming self-curing concrete.

SUMMARY

According to a first aspect of the present disclosure, there is provided a method of forming self-curing concrete. The method comprises the steps of mixing cement, aggregates, and dry MIL-101(Cr) metal-organic framework (MOF) to form a mixture; incorporating the mixture with water to form concrete; and curing the wet concrete. During the step of curing, the MIL-101(Cr) MOF adsorbs water from a surrounding atmosphere. The MIL-101(Cr) MOF is 3-9 wt. % relative to the cement, such that the adsorption of water by the MIL-101(Cr) MOF enables the wet concrete to self-cure.

The MIL-101(Cr) MOF adsorbs water from the surrounding atmosphere, eliminating the need for external water sources during curing. It has been found that a 3-9 wt. % of MIL-101(Cr) MOF relative to the cement provides advantageous properties such as compression strength, enhancement of the degree of hydration, and a decrease in water absorption and permeable pore void volume.

The self-curing process will help make eco-friendly structures and save a large amount of water needed for curing. Using self-curing agents reduces the water evaporation from concrete and enhances its water retention capacity.

The step of mixing may comprise mixing the cement and aggregates to form a cement and aggregate mixture; and incorporating the dry MIL-101(Cr) MOF into the cement and aggregate mixture to form the mixture.

The MIL-101(Cr) MOF may have an average particle size of less than 10 μm.

The MIL-101(Cr) MOF may have an average particle size of between 3-7 μm.

The MIL-101(Cr) MOF may have an average particle size of between 4-6 μm.

The MIL-101(Cr) MOF may have a Brunauer, Emmet, and Teller (BET) average surface area of between 2500 and 2700 $m^2/g$.

The MIL-101(Cr) MOF may be between 3-9 wt. % relative to the cement.

The MIL-101(Cr) MOF may be between 3-6 wt. % relative to the cement.

The MIL-101(Cr) MOF may be between 5-6 wt. % relative to the cement.

The MIL-101(Cr) MOF quantity may be substantially 6 wt. % relative to the cement. Substantially 6 wt. % may refer to a range between 5.5 wt. % and 6.5 wt. %.

This percentage range enhances the compressive strength, water absorption, permeable pore voids, and degree of hydration.

The surrounding atmosphere may have a relative humidity between 35% and 75%.

The cement-to-aggregate ratio may be between 1:3 and 1:5 by weight.

The water-to-cement ratio may be between 0.4-0.6 by weight.

According to a second aspect of the present disclosure, there is provided a composition for forming concrete, the composition compromising cement, aggregate, water, and MIL-101(Cr) metal organic framework (MOF). The MIL-101(Cr) MOF is 3-9 wt. % relative to the cement.

The cement to aggregate ratio may be between 1:3 and 1:5 by weight.

The water to cement ratio may be between 0.4-0.6 by weight. According to the third aspect of the present disclosure, there is provided self-curing concrete formed using a method of the first aspect.

According to a third aspect of the present disclosure, there is a provided self-curing concrete formed using the method of the first aspect.

It will be appreciated that features disclosed in relation to one aspect may be used in combination with another aspect, and vice versa.

BRIEF DESCRIPTION OF THE DRAWINGS

The manner in which the above-recited features of the present invention are understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The preceding and other objects, features, and advantages of the present invention and the invention itself will be more fully understood from the following description of preferred embodiments when read together with the accompanying drawings.

DETAILED DESCRIPTION

The present disclosure relates to the field of self-curing concrete, and more particularly to self-curing concrete comprising dry MIL-101(Cr) metal-organic framework.

The principles of the present invention and their advantages are best understood by referring to FIG. 1 to FIG. 6b. In the following detailed description of illustrative or exemplary embodiments of the disclosure, specific embodiments in which the disclosure may be practiced are described in sufficient detail to enable those skilled in the art to practice the disclosed embodiments. Therefore, the following detailed description is not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
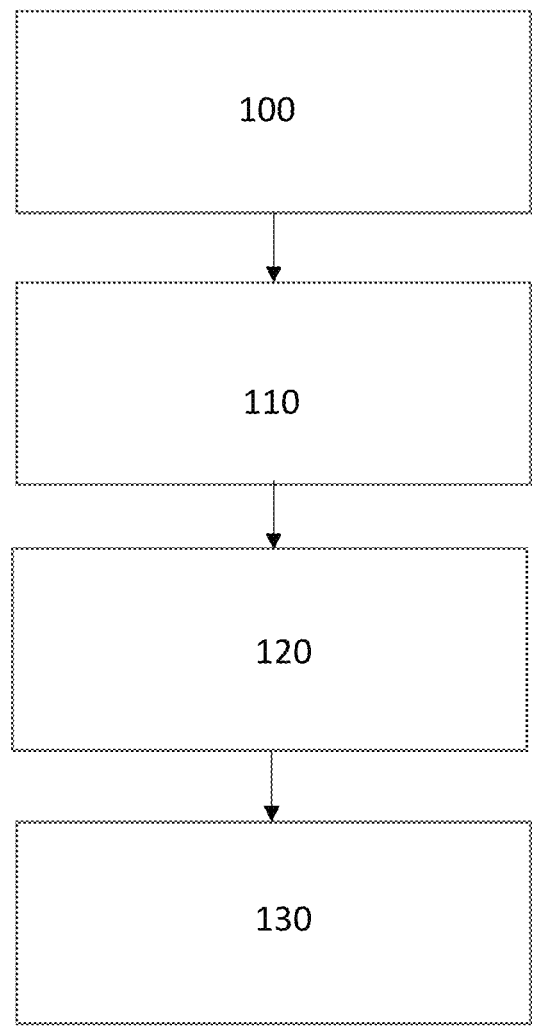
FIG. 1 shows a method of forming self-curing concrete according to an embodiment of the present disclosure.

FIG. 1 shows a method of forming self-curing concrete according to an embodiment of the present disclosure.

In mixing step 100, fine aggregates, coarse aggregates, and cement are mixed for three minutes under ambient conditions using a concrete mixer. In embodiments, ambient conditions refer to laboratory ambient conditions, being 21-25 degrees Celsius and average relative humidity of 55%.

The cement and aggregate mixture has a cement-to-aggregates mass ratio of 1:4.

A porous matrix class is called Metal-Organic Frameworks (MOFs), which are solids resulting from reticular chemistry that have appeared as an extensive class of crystalline materials with high porosity up to 90% free volume. MOFs are composed by joining metal-containing units with organic linkers using strong bonds to produce an open crystalline framework with permanent porosity. It has been surprisingly found that MOFs have high water uptake, thereby realizing the vision of harvesting water from the atmosphere at any time and under various conditions. MOFs' potential to capture H2O from the atmosphere suggests its use as a self-curing agent in making concrete. MOFs' structure can be designed to allow both the capture of water from the desert air and its release with the least energy requirements.

Materials of Institute Lavoisier Frameworks (MIL) materials are materials for MOFs. MIL-101 is a series of MOFs with similar zeolite topology but differ in other characteristics. MIL-101 (Cr) MOF is a chromium-based MOF from the MIL-101 series.

In incorporating step 110, dry MIL-101 (Cr) MOF is incorporated homogeneously into the cement and aggregate dry mixture by mixing for two minutes without water. The amount of MIL-101 (Cr) MOF incorporated is 3-6% by mass relative to the cement.

It has been found that this ratio of MIL-101 (Cr) MOF relative to the cement provides optimal concrete characteristics once cured, particularly improved compressive strength, fewer permeable pore voids, lower water absorption, and higher degree of hydration.

MIL-101 (Cr) MOF is dried out at 110° C. for 24 hours for activation before it is used in the concrete mix.

MIL-101(Cr) has been selected as an $H_2O$ adsorbent to be incorporated into the concrete mixes due to its high $H_2O$ adsorption capacity (1 g/g), average particle size of 5 μm and high Brunauer, Emmet, and Teller (BET) number, and an average surface area of 2606 m2/g. It has been found that these features make it an ideal candidate for capturing $H_2O$ from the relative humidity in the surrounding environment.

In incorporating step 120, water is added gradually to the dry components (aggregates, cement, and MIL-101 (Cr) MOF and mixed for two minutes.

Water is added in the water-to-cement ratio of 0.5.

In curing step 130, the self-curing concrete composition is left to cure in the atmosphere (having a relative humidity of between 35% and 75%) for at least 7 days.

Also, in curing step 130, the fresh concrete is cast and placed into 50-mm cubic molds to cure.

The MOF-incorporated cement-based concrete comprises an ASTM Type I ordinary Portland cement (OPC), crushed dolomitic limestone aggregates, tap water, and dry MIL-101 (Cr) MOF. The crushed dolomitic limestone aggregates have a maximum size of 5 mm.

Experimental Data

TABLE 1

Concrete mixture references

| Mix | MOF % | Curing Regime | Mix ID |
|---|---|---|---|
| Control | 0% | Air-cured | C0-air |
|  |  | 7 days moist-cured | C0-7W |
| M3 | 3% | 35% Relative humidity | M3-35 |
|  |  | 50% Relative humidity | M3-50 |
|  |  | 75% Relative humidity | M3-75 |
| M6 | 6% | 35% Relative humidity | M6-35 |
|  |  | 50% Relative humidity | M6-60 |
|  |  | 75% Relative humidity | M6-75 |

TABLE 1-continued

Concrete mixture references

| Mix | MOF % | Curing Regime | Mix ID |
|---|---|---|---|
| M9 | 9% | 35% Relative humidity | M9-35 |
|  |  | 50% Relative humidity | M9-50 |
|  |  | 75% Relative humidity | M9-75 |

Table 1 shows the assessed concrete mixtures. In Table 1, the references used for the different concrete mixtures are shown under the column "Mix ID."

In the 7 days of moist curing, specimens were placed in a water curing tank for 7 days (temperature 23° C.±2). On the other hand, air curing involved leaving the specimens under laboratory ambient conditions (i.e., average temperature 23° C.±2 and average relative humidity 55%) without any curing method. The selected different relative humidities resemble the various relative humidities in different desert regions. The 75% relative humidity resembles the humidity in coastal cities such as Dubai or Abu Dhabi. The 50% relative humidity resembles the northern emirates of the United Arab Emirates, for example, while the 35% relative humidity resembles inland cities such as Al Ain. Furthermore, the different relative humidity curing conditions were controlled in closed chambers.

TABLE 2

Average compressive strength for concrete mixtures

| Concrete Mixtures | Compressive Strength (MPa) | | |
|---|---|---|---|
|  | 7 days | 28 days | 90 days |
| C0-7W | 42.3 ± 1.6 | 50.0 ± 1.3 | 53.0 ± 0.7 |
| C0-air | 31.7 ± 0.9 | 40.3 ± 2.4 | 41.1 ± 1.0 |
| M3-35 | 31.3 ± 2.8 | 40.0 ± 1.6 | 40.3 ± 1.4 |
| M3-50 | 33.6 ± 2.4 | 45.0 ± 1.0 | 46.2 ± 1.2 |
| M3-75 | 30.9 ± 0.2 | 41.5 ± 0.3 | 45.3 ± 1.5 |
| M6-35 | 34.8 ± 0.7 | 37.4 ± 0.5 | 39.5 ± 0.5 |
| M6-50 | 30.0 ± 1.2 | 38.4 ± 0.5 | 41.3 ± 0.6 |
| M6-75 | 39.0 ± 2.4 | 40.8 ± 0.5 | 42.3 ± 0.1 |
| M9-35 | 21.7 ± 1.1 | 22.8 ± 2.0 | 23.4 ± 1.0 |
| M9-50 | 20.9 ± 1.9 | 25.4 ± 0.9 | 26.0 ± 0.8 |
| M9-75 | 21.7 ± 1.5 | 26.1 ± 2.0 | 27.0 ± 0.3 |

The mechanical properties, water absorption and permeable pore voids, and the concrete mixes' hydration degree were assessed using the compressive strength, water absorption, permeable pore voids volume, and the degree of hydration.

The cube compressive strength of concrete was evaluated following the BS EN-12390-3 (B.S EN, 2002) at 7, 28, and 90 days of age. The test assessed the mechanical performance of the produced MOF-incorporated concrete. Moreover, water absorption and permeable pore voids at 7, 28, and 90 days of age were evaluated as per the procedure of ASTM C642 (ASTM C642, 2001). The tests were performed to examine the effect of incorporating MOF in cement-based concrete and exposed to different relative humidity conditions on the durability of the concrete mix. Furthermore, the non-evaporable water was measured at 7, 28, and 90 days of age by heating a powder sample from the concrete mix in a muffle furnace at 950° C. for 4 hours and measuring the mass loss. The mass loss in the sample is the non-evaporable water.

The microstructure of MOF-incorporated concrete was characterized at 28 days of age using a scanning electron microscope (SEM) to ensure the presence of MOF particles in the samples. SEM images were captured using a JEOL-JSM 6390A microscope and energy-dispersive X-ray (EDX). Samples were collected from specimens after conducting the compressive strength test.

The compressive strength is measured at three different test ages (7, 28, and 90 days) to account for the development of the concrete microstructure. With high water absorption capacity, the internal curing agent releases water into the cementitious matrix when the internal humidity decreases. This will maintain high relative humidity and continue the hydration process, improving compressive strength. The strength values presented in Table 2 were attained by taking the average of three specimens for each concrete mixture at the required test age. The compressive strength of the concrete increases with age, as Table 2 illustrates the compressive strength values for all concrete mixes at 7, 28, and 90 days.

TABLE 3

Water Absorption results

| Concrete Mixtures | Water Absorption (%) | | |
|---|---|---|---|
|  | 7 days | 28 days | 90 days |
| C0-7W | 5.83% ± 0.07 | 5.79% ± 0.04 | 5.58% ± 0.22 |
| C0-air | 6.44% ± 0.09 | 6.07% ± 0.33 | 6.05% ± 0.22 |
| M3-35 | 6.41% ± 0.06 | 6.04% ± 0.42 | 6.03% ± 0.24 |
| M3-50 | 6.26% ± 0.25 | 5.90% ± 0.32 | 5.69% ± 0.23 |
| M3-75 | 6.57% ± 0.17 | 5.95% ± 0.41 | 5.71% ± 0.33 |
| M6-35 | 6.33% ± 0.20 | 6.30% ± 0.13 | 6.07% ± 0.23 |
| M6-50 | 6.44% ± 0.10 | 6.29% ± 0.07 | 5.87% ± 0.12 |
| M6-75 | 6.11% ± 0.16 | 6.09% ± 0.44 | 5.81% ± 0.28 |
| M9-35 | 6.64% ± 0.16 | 6.51% ± 0.13 | 6.40% ± 0.13 |
| M9-50 | 6.71% ± 0.25 | 6.44% ± 0.15 | 6.20% ± 0.23 |
| M9-75 | 6.69% ± 0.16 | 6.46% ± 0.18 | 6.14% ± 0.12 |

TABLE 4

Permeable Pore Voids results

| Concrete Mixtures | Permeable Pores (%) | | |
|---|---|---|---|
|  | 7 days | 28 days | 90 days |
| C0-7W | 13.6% ± 0.69 | 14.03% ± 0.15 | 13.89% ± 0.30 |
| C0-air | 16.25% ± 0.20 | 16.06% ± 0.43 | 15.05% ± 0.48 |
| M3-35 | 16.24% ± 0.37 | 16.03% ± 0.46 | 14.95% ± 1.46 |
| M3-50 | 16.05% ± 0.66 | 15.06% ± 0.90 | 14.29% ± 0.85 |
| M3-75 | 16.23% ± 0.46 | 15.21% ± 0.86 | 14.45% ± 0.43 |
| M6-35 | 16.17% ± 0.94 | 16.11% ± 0.06 | 15.05% ± 0.15 |
| M6-50 | 16.37% ± 0.37 | 16.19% ± 1.14 | 14.88% ± 0.11 |
| M6-75 | 15.47% ± 0.22 | 15.36% ± 2.00 | 14.66% ± 0.54 |
| M9-35 | 17.93% ± 0.88 | 17.80% ± 0.15 | 17.34% ± 0.77 |
| M9-50 | 18.61% ± 0.56 | 16.42 ± 0.73 | 16.34% ± 2.00 |
| M9-75 | 18.38% ± 0.26 | 16.41% ± 0.43 | 16.33% ± 0.5 |

The water absorption and permeable pores at 7, 28, and 90 days are presented in Table 3 and Table 4. Water curing for 7 days (C0-7W) had the lowest water absorption and permeable pores values compared to all concrete mixtures at all test ages. In contrast, C0-air attained the highest values among all control mixes. At an early age, 7 days, for M3 mixes, i.e., 35, 50, and 75% relative humidity, the water absorption slightly increased by 9%, 7%, and 11% compared to C0-7W. While the increase in the permeable pores values was 16%, 15%, and 15% than C0-7W. However, there was a slight reduction in both tests compared to C0-air. Similar behavior was noticed for M6 mixes. Comparing M6 mixes cured at 35%, 50%, and 75% relative humidity. with C0-7W showed a marginal increase of 8%, 9%, and 5%, respectively. Nevertheless, the corresponding permeable voids were higher by 16%, 17%, and 12% compared with C0-7W. Also, M6 mixes showed marginally reduced values compared to C0-air for water absorption and permeable pore voids. The water absorption and permeable pores were reduced the most among all MOF mixtures by 18% by adding 6% MOF to the mix exposed to 75% relative humidity curing condition. These results are well-aligned with the compressive strength results. This could be attributed to the availability of internal moisture and the development of a denser microstructure due to the continuation of hydration. Conversely, mixes with 9% MOF under all relative humidity conditions experienced increased water absorption at 7 days, up to 13% more than C0-7W and 4% more than C0-air. The permeable pores values were significantly higher than C0-7W by 24%, 27%, and 26% for M9-35, M9-50, and M9-75, respectively, and 9 to 13% more than C0-air, which confirms the compression test results. This observation might be attributed to the fact that as the level of MOF increased beyond 6%, the MOF's porosity overcame the development in the concrete microstructure. Therefore, the permeable voids and water absorption increased, and the compressive strength decreased; this is well-aligned with the 7 days compressive strength outcomes. This shows that the concrete, according to embodiments of the present disclosure, performs better than air-cured concrete. The advantage of not requiring external water curing for concrete of embodiments of the present disclosure outweighs any potential marginal decrease in properties/attributes compared to water-cured concrete.

The water absorption and permeable pores results at 28 days of age were the lowest for the control mix without MOF, C0-7W. M3-35 had a slightly marginal higher percentage at 28 days compared to C0-7W in water absorption and permeable pores by 4% and 12%, respectively. There was a slight decrease in both tests compared to C0-air. The test results for water absorption and permeable pores showed that adding 3% MOF to the mix, with 50% relative humidity curing condition, provides the lowest values. These outcomes are in agreement with the compressive strength results. The M3-50 mix showed insignificant higher percentages at 28 days compared to C0-7W in water absorption and permeable pore voids, by 3% and 1%, respectively. However, it achieved lower values in water absorption and permeable pores by 3, and 6% than the control mix C0-air. The M3 mix at 75% relative humidity showed slightly higher values by 3% compared to C0-7W in water absorption and 8% in permeable pores. Yet, the mix showed lower values by 2 and 5% compared to C0-air in both tests. On the other hand, incorporating 6% MOF to the mix at 35% curing condition revealed higher water absorption by 8% and 4% compared with C0-7W and C0-air, respectively. While the permeable pores were increased by 13% and 1% compared with C0-7W and C0-air, respectively. The MOF mix M6-50 (i.e., cured at 50% relative humidity) observed more water absorption values by 8% and 3%, similarly higher permeable pores values by 13% and 1%, than C0-7W and C0-air, respectively. Including 6% MOF and 75% relative humidity increased the water absorption by 7% more than C0-7W. At the same time, the corresponding permeable voids were 9% higher than C0-7W. In contrast, water absorption and permeable pores were reduced by 2% to 4% compared with C0-air. The 9% MOF addition under all curing conditions caused a significant increase at 28 days in the permeable pore voids and the water absorption; the increase was around 11% to 21% compared with the control mixes C0-7W and C0-air. This observation might be interpreted in that as the amount of MOF increased beyond 6%, the MOF's porosity overcame the enhancement in the concrete microstructure. Thus, the permeable voids and water absorption increased.

At 90 days, the water absorption of mixes made with 3% MOF at 35% relative humidity was 7% higher and 4% in permeable pores than C0-7W. Compared with C0-air, the reduction was insignificant. While it had slightly higher percentages of 2% and 3% in water absorption and permeable pores than C0-7W, respectively. In contrast, M3-50 had lower values than C0-air by 6% and 5% in water absorption and permeable pores, respectively. The MOF mix M3-75 (i.e., cured at 75% relative humidity) increased the water absorption by 2% compared with C0-7W; the corresponding permeable pore voids were 4% higher than C0-7W. Adding 6% MOF to the mix, with 35% relative humidity curing condition, reached marginal increase values in water absorption by 8% and 5%, along with permeable pore voids by 8% and 7%, respectively, compared with C0-7W. Mix M6-50 revealed an insignificant increase in the water absorption and permeable pores by 5% and 7% compared with C0-7W, respectively. The MOF mix M6-75 observed slightly higher percentages of 4% in water absorption and 5% in permeable pores compared to C0-7W. For M6 mixes under all relative humidity conditions, they indicated nearly an equal value with C0-air. These test results are well-aligned with the compressive strength values. Increasing the amount of the added MOF to the mix up to 9% significantly increased the water absorption and permeable pores at late ages, i.e., 90 days. Mix M9 at 35% relative humidity, the values of water absorption and permeable pores were significantly higher than C0-7W and C0-air, 13% and 5%, 20% and 13%, respectively. M9-50 had higher percentages of 10% and 3% in water absorption compared with C0-7W and C0-air, respectively. The corresponding permeable pores were 15% and 8% higher, respectively. While the M9 mix cured at 75% relative humidity, the water absorption values were increased by 9% and 2% compared to C0-7W and C0-air, respectively, along with 15% and 8% more percentages in permeable pores. Adding MOF increased the compressive strength and decreased the water absorption and permeable pore voids, with 3% MOF being superior to 6% MOF and 9% MOF at a late age.

Increasing the quantity of MOF in the concrete mix generally increased the water absorption and permeable pore voids properties. Results provide evidence of the densification of the concrete structure owing to the continuous internal curing due to the inclusion of MOF with varying effects depending on the MOF level. The increase in compressive strength with age is attributed to the continuation of hydration and microstructure densification. The strength development was higher than C0-air and sometimes higher than C0-7W. Ultimately, at 7, 28, and 90 days, mixes of 3% and 6% MOF were characterized by lower water absorption and permeable pores, denser matrix, and higher compressive strength than mixes of 9% MOF. A higher MOF dose negatively impacted the water absorption, compressive strength, and permeable pores, as it highly increased the absorption percentages for M9 mixes. Therefore, based on the trend observed at the different test ages, it could be concluded that MOF addition by 3 and 6% appeared to improve the microstructure densification and refine the pore structure. Adding a considerable amount of MOF to concrete may create more voids, thus resulting in higher water absorption, permeable pores, and lower compressive strength, as with a 9% MOF addition. At early ages (i.e., 7 days), adding 6% MOF to the mix and curing condition 30 or 70% relative humidity achieved better results in compressive strength, water absorption, and permeable pores, compared to 50% relative humidity. MOF mixes include 3% by cement mass, at 7 days, at curing condition 50% relative humidity, achieved better compressive strength, water absorption, and permeable pores, compared to 30 and 70% relative humidity. Moreover, at 28 days, adding 3% MOF to the mix, cured at 50% relative humidity, presents the lowest values for both tests. These outcomes were well aligned with the compressive strength results.

TABLE 5

Degree of Hydration results

| Concrete Mixtures | Degree of Hydration (g/g) | | |
|---|---|---|---|
| | 7 days | 28 days | 90 days |
| C0-7W | 0.35 ± 0.008 | 0.38 ± 0.005 | 0.40 ± 0.010 |
| C0-air | 0.31 ± 0.001 | 0.35 ± 0.001 | 0.37 ± 0.003 |
| M3-35 | 0.31 ± 0.001 | 0.35 ± 0.004 | 0.37 ± 0.006 |
| M3-50 | 0.32 ± 0.006 | 0.37 ± 0.002 | 0.38 ± 0.001 |
| M3-75 | 0.30 ± 0.002 | 0.35 ± 0.002 | 0.38 ± 0.010 |
| M6-35 | 0.32 ± 0.009 | 0.34 ± 0.005 | 0.37 ± 0.005 |
| M6-50 | 0.31 ± 0.004 | 0.35 ± 0.004 | 0.38 ± 0.003 |
| M6-75 | 0.34 ± 0.005 | 0.36 ± 0.002 | 0.38 ± 0.007 |
| M9-35 | 0.26 ± 0.010 | 0.28 ± 0.009 | 0.30 ± 0.009 |
| M9-50 | 0.27 ± 0.000 | 0.29 ± 0.003 | 0.31 ± 0.006 |
| M9-75 | 0.27 ± 0.005 | 0.30 ± 0.000 | 0.31 ± 0.010 |

Non-evaporable water content (i.e., measured as the mass of non-evaporable water per unit sample mass g/g), as shown in Table 5, was utilized to evaluate the degree of hydration of the mixes at 7, 28, and 90 days. The effect of MOF on the hydration of concrete mixes was investigated using the non-evaporable water content measurement. At 7 days of age, the control mix without MOF moist-cured for 7 days, C0-7W, had the highest degree of hydration. Mix C0-7W achieved a higher degree of hydration than C0-air by 11%. Comparing the MOF-embedded concrete mix, M3-35 showed a reduction of 11% compared to C0-7W. While there was an insignificant decrease compared with C0-air. M3-50 mix revealed a marginal decrease of 9% than C0-7W. While it had an increase of 3% over C0-air, indicating better hydration. The MOF mix M3 cured at 75% relative humidity showed a lower value of 14% and 3% than the control mixes C0-7W and C0-air, respectively. On the other hand, adding 6% MOF to the concrete and curing under 35%, 50%, and 75%% relative humidity. indicated lower values by 9%, 11%, and 3% compared with C0-7W, respectively. Mix M6-75 showed an insignificant reduction compared with C0-7W, consistent with the highest compressive strength value among all MOF mixtures. MOF-embedded mix M6 achieved higher values, varying from 3% to 10%, compared to C0-air, which was aligned with the compressive strength results. The lowest degree of hydration among all MOF mixtures was for M9 mixes cured at different relative humidity conditions. The degree of hydration was lower by values from 23% to 26% than that of C0-7W. While M9 mixes have a lower degree of hydration values ranging from 13% to 16% compared to C0-air. These results are consistent with the compressive strength results of M9 mixes compared to the control mixes.

At 28 days of age, the 7 days water curing regime for the control mix, C0-7W, led to the highest degree of hydration amongst all concrete mixtures, which improved the compressive strength. For air curing (C0-air), the degree of hydration was 8% lower than C0-7W. The M3 mixes showed an insignificant reduction in the degree of hydration compared to mix C0-7W. The reduction ranges from 3% to 8%. Compared to C0-air, M3-35 achieved a higher degree of hydration by 6%, M3-50 had the same degree of hydration as C0-air, and M3-75 showed a lower hydration degree by 3%. M3-35 achieved a degree of hydration slightly lower than that of C0-7W (i.e., a reduction of 3%), M3-50 had a lower hydration degree of 3% than C0-7W, while M3-75 showed an 8% reduction compared to C0-7W. Furthermore, MOF mixes incorporating 6% had reduced values of 11% for M6-35, 8% for M6-50, and 5% for M6-75, compared with C0-7W. The C0-air control mix showed a higher value of 3% compared with M6-35 and an equal value and a lower value of 3% compared to M6-50 and M6-75, respectively. Increasing the MOF quantity to 9% resulted in a low degree of hydration compared to C0-7W. The reductions were 26%, 24%, and 21% for M9-35, M9-50, and M9-75, respectively. Also, comparing M9 mixes with C0-air revealed a significant reduction of 20% for M9-35, while 17% for M9-50 and M9-75. At the late age (i.e., 90 days), C0-7W had the highest result among all concrete mixtures, confirming its highest degree of hydration and compressive strength.

The air-cured control mix, C0-air, showed an 8% reduction compared to C0-7W. For the MOF mix, M3 achieved lower values compared to C0-7W. The M3 mixes, M3-35, M3-50, and M3-75, showed insignificant lower values (i.e., 5% to 8%) than C0-7W. Mix M3-35 had an equal value as C0-air, while M3-50 and M3-75 achieved higher hydration by 3% than C0-air. The MOF mix with 6% MOF addition at 35% relative humidity condition had a lower value of 8% compared to C0-7W. Mixes M6-50 and M6-75 showed a lesser value of 5% than that of C0-7W. Comparing M6 mixes to the control mix C0-air, the M6 mixes produced an equal value for M6-35, while a higher degree of hydration value by 3% for mixes M6-50 and M6-75. However, M9 mixes, as demonstrated from all other tests (i.e., compressive strength, water absorption, and permeable pore voids), revealed the lowest results among all concrete mixtures, indicating a low degree of hydration values. Comparing the M9 mixes to C0-7W, the MOF mixes M9-35, M9-50, and M9-75 had lesser values of 23% and 25%. At the same time, the C0-air result varies from 16% to 20% higher than M9 mixes. Results are well-aligned with the compressive strength results, water absorption, and permeable pore voids.

Based on the evaluation of compressive strength, water absorption, permeable pore voids, and degree of hydration at early ages, the optimal MOF addition is suggested to be 6% with 75% relative humidity, as it demonstrates a strong correlation. While at 28 days, the recommended MOF level is 3% at a relative humidity of 50 to 75%, this shows a good correlation with the assessed compressive strength, water absorption, permeable pores, and degree of hydration.

Mixes incorporating MOF, M3, and M6 did not appear to show a noticeable difference in non-evaporable water content from the control mixes. It is possible that with the continued internal availability of moisture from the MOF, the hydration process could continue, and the non-evaporable water content will reach that of the control mixes. The MOF mixes with higher compressive strength, lower water absorption, and permeable pores values (i.e., M3 and M6) showed an increase in the degree of hydration compared to the MOF mixes M9. The MOF level (i.e., 3% and 6%) had a more pronounced effect on the degree of hydration than the 9% MOF content.

SEM analysis was performed to examine the microstructure development and modifications for the control mixes (without MOF) and the MOF mixes that included different MOF dosages and achieved the highest compressive strength at 28 days (i.e., C0-7W, C0-air, M3-50, and M6-75).

The MOF mix that achieved the lowest compressive strength (i.e., M9-75) was also examined.

Figures 2A, 2B:
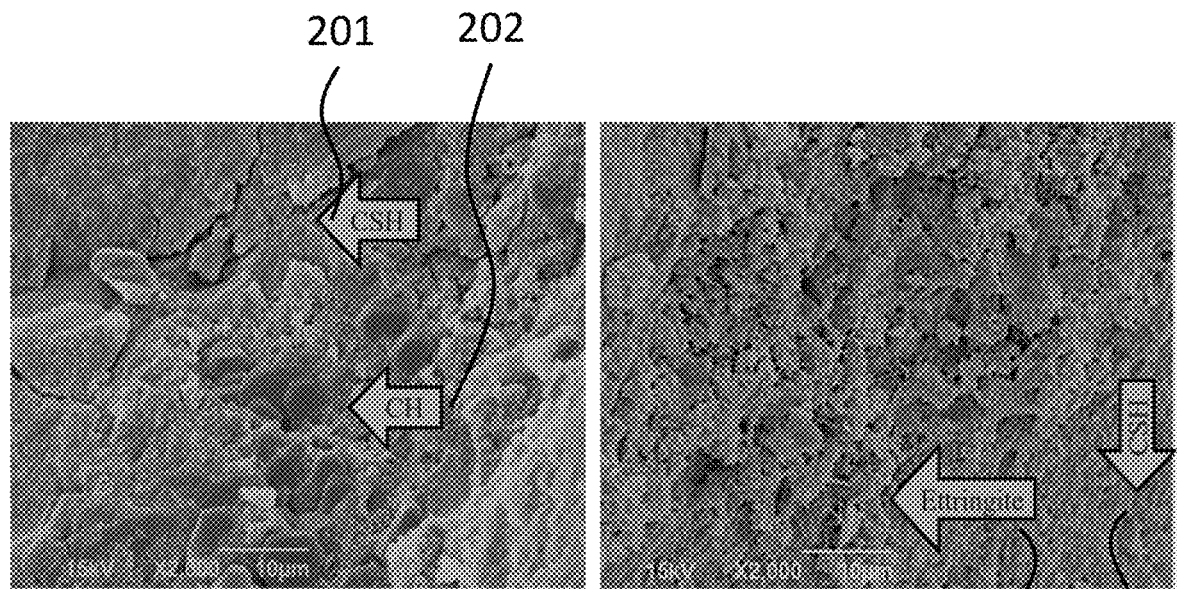
FIG. 2(a) and FIG. 2(b) show an SEM analysis for a water-cured control mix without a metal-organic framework (MOF) at 28 days.

FIG. 2(a) and FIG. 2(b) show an SEM analysis for a water-cured control mix without a metal-organic framework (MOF) at 28 days.

The microstructure of C0-7W is dense, as illustrated in the SEM micrograph (FIG. 2(a) and FIG. 2(b)). The microstructure densification is attributed to the 7 days of moist curing, resulting in better-formed and packed hydration products and less porous microstructure. The size of the formed crystals is small, indicating the unavailability of space for their growth.

An intermix of the main hydration products was observed, including calcium hydroxide (CH) 202, calcium silicate hydrate CSH 201, and ettringite 203.

Figures 3A, 3B:
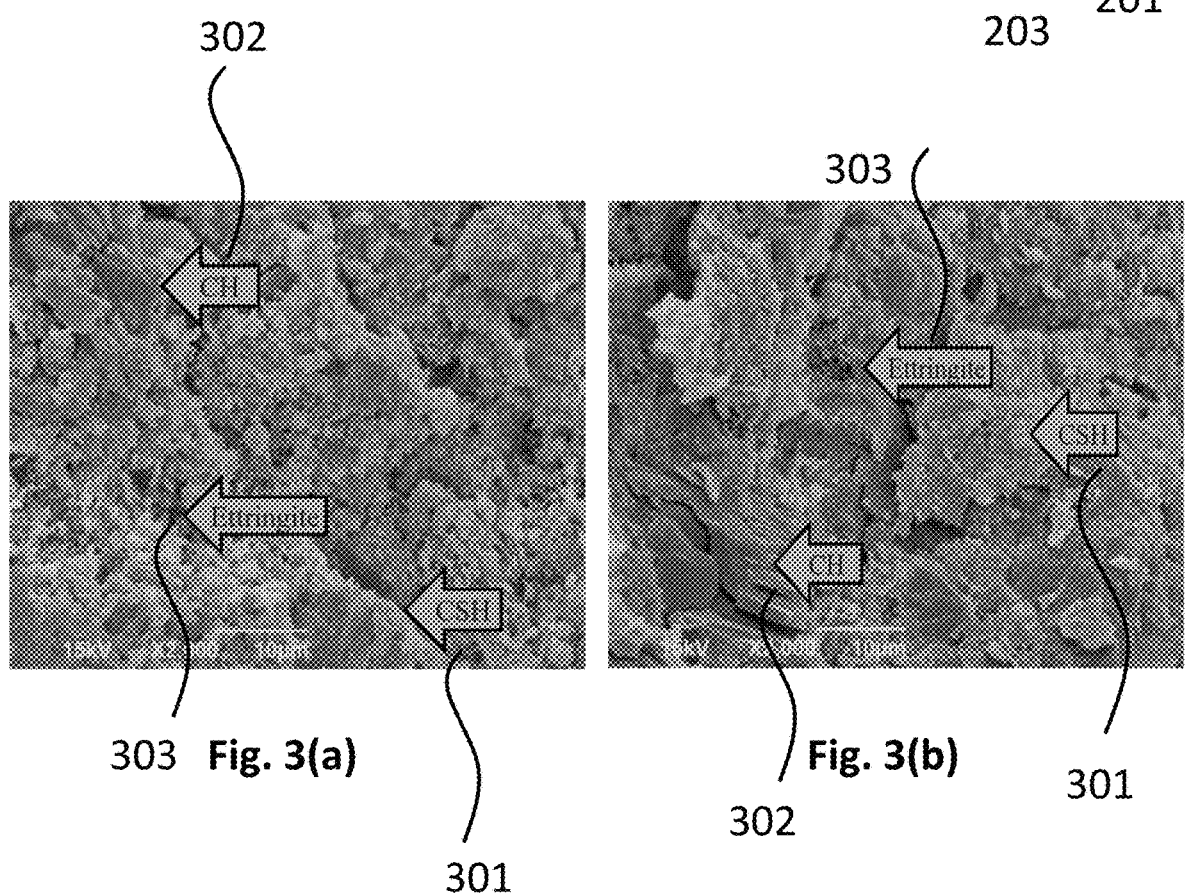
FIG. 3(a) and FIG. 3(b) show an SEM analysis for an air-cured control mix without MOF at 28 days.

FIG. 3(a) and FIG. 3(b) show an SEM analysis for air cured control mix, without MOF, at 28 days. The general hydration products, CSH 301, calcium hydroxide 302, and ettringite 303, are identified, as verified by the SEM images. Meanwhile, the morphology shows a more porous microstructure compared to C0-7W. Nevertheless, it is worth noting that the formed crystals are bulk and well-defined, owning to the air curing regime, which resulted in a lower degree of hydration and more space for the crystals to be well-formed and grow.

Figure 4:
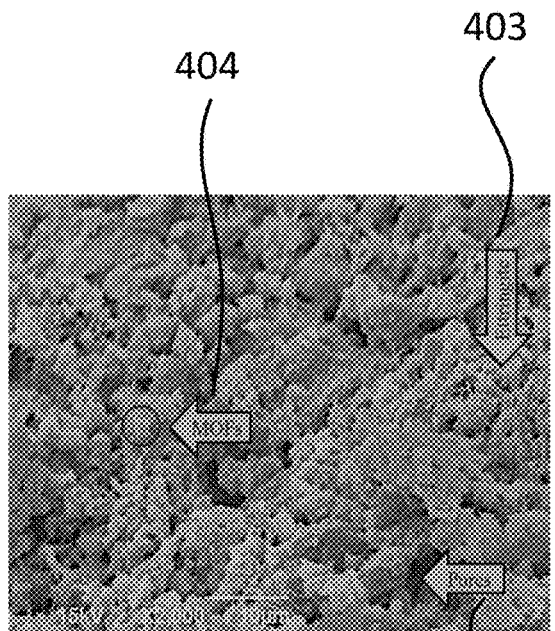
FIG. 4 shows an SEM analysis for concrete incorporating MOF by 3% by weight of the cement and under 50% relative humidity (M3-50) according to an embodiment of the present disclosure.

FIG. 4 shows an SEM analysis for concrete incorporating MOF 404 by 3% by weight of the cement and under 50% relative humidity (M3-50) according to an embodiment of the present disclosure. The microstructure of the MOF-embedded concrete M3-50 is demonstrated in FIG. 4. SEM images for M3-50 indicate that the voids 405 range between 5-10 μm. The MIL-101(Cr) particles were distributed across. Compared to the counterpart control mix MOF C0-7W, both have a comparable dense microstructure. Ettringite 403 was also observed.

Figure 5:
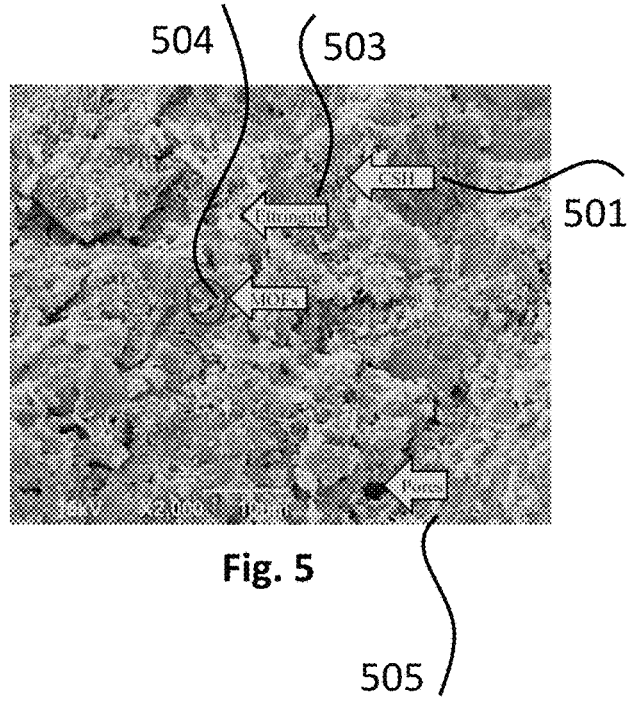
FIG. 5 shows an SEM analysis for concrete incorporating MOF by 6% by weight to the cement and under 75% relative humidity (M6-75) according to an embodiment of the present disclosure.

FIG. 5 shows an SEM analysis for concrete incorporating MOF 504 by 6% by weight to the cement and under 75% relative humidity (M6-75) according to an embodiment of the present disclosure.

The SEM image for M6-75, shown in FIG. 5, indicates the formation of a less dense microstructure. The crystalline phases developed in a more oversized crystal due to voids 505 reaching an average of 20-25 μm in size. MOF 504 particles, CSH 501, and ettringite 503 were observed during the SEM test.

Figure 6A:
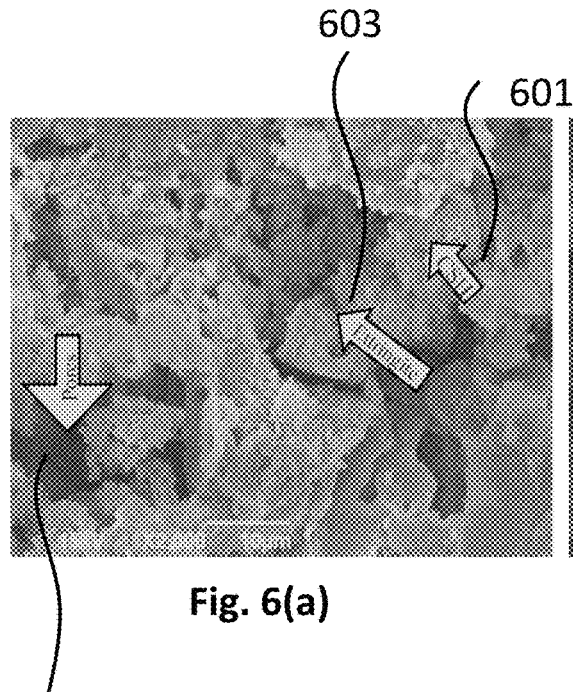
FIG. 6(a) and FIG. 6(b) show an SEM analysis for concrete incorporating MOF by 9% by weight of the cement under 75% relative humidity (M9-75) according to an embodiment of the present disclosure.
Figure 6B:
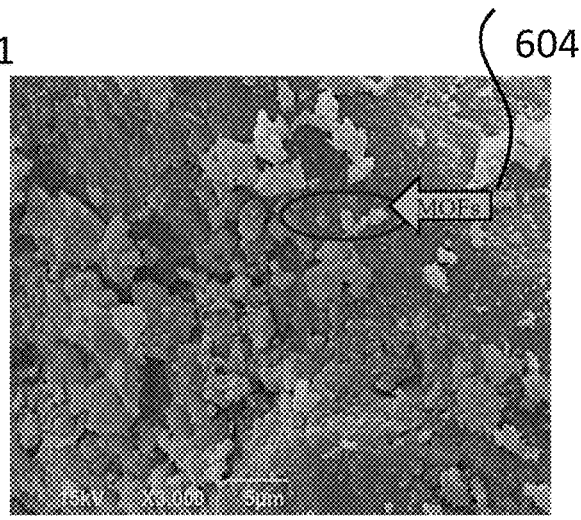

FIG. 6(a) and FIG. 6(b) show an SEM analysis for concrete incorporating MOF 604 by 9% by weight of the cement under 75% relative humidity (M9-75) according to an embodiment of the present disclosure.

Comparing M9-75 with C0-7W, the control mix C0-7W has a denser microstructure due to the fewer voids, consistent with the water absorption in Table 3 and permeable pore voids in Table 4. Conversely, several MOF particles were visible in mix M9-75, owing to the high dosage of MOF. The pores/voids 605 are large. CSH 601 and ettringite 603 were also observed.

It will be apparent to those skilled in the art that various modifications and variations can be made in the present invention without departing from the spirit or scope of the inventions. Thus, it is intended that the present invention covers the modifications and variations of this invention, provided they come within the scope of the appended claims and their equivalents. The disclosures and the description herein are intended to be illustrative and do not limit the present disclosure, defined in scope by the following claims.

Many changes, modifications, variations, and other uses and applications of the present disclosure will become apparent to those skilled in the art after considering this specification and the accompanying drawings, which disclose the preferred embodiments. All such changes, modifications, variations, and other uses and applications that do not depart from the spirit and scope of the present disclosure are deemed to be covered by the invention, which is to be limited only by the claims that follow.

The invention claimed is:

1. A method of forming self-curing concrete comprising the steps of:
    mixing cement, aggregates, and dry MIL-101(Cr) metal-organic framework (MOF) to form a mixture;
    incorporating the mixture with water to form wet concrete; and
    curing the wet concrete,
    wherein during the step of curing, the MIL-101(Cr) MOF adsorbs water from a surrounding atmosphere, and
    wherein the MIL-101(Cr) MOF is 3-9 wt. % relative to the cement,
    such that the adsorption of water by the MIL-101(Cr) MOF enables the wet concrete to self-cure,
    wherein the water-to-cement ratio is between 0.4-0.6 by weight.

2. A method of forming self-curing concrete according to claim 1, wherein the step of mixing comprises:
    mixing the cement and aggregates to form a cement and aggregate mixture; and
    incorporating the dry MIL-101(Cr) MOF into the cement and aggregate mixture to form the mixture.

3. A method of forming self-curing concrete according to claim 1, wherein the MIL-101(Cr) MOF has an average particle size of less than 10 μm.

4. A method of forming self-curing concrete according to claim 3, wherein the MIL-101(Cr) MOF has an average particle size of between 3-7 μm.

5. A method of forming self-curing concrete according to claim 4, wherein the MIL-101(Cr) MOF has an average particle size of between 4-6 μm.

6. A method of forming self-curing concrete according to claim 1, wherein the MIL-101(Cr) MOF has a Brunauer, Emmet, and Teller (BET) average surface area of between 2500 and 2700 μm2/g.

7. A method of forming self-curing concrete according to claim 1, wherein the surrounding atmosphere has a relative humidity between 35% and 75%.

8. A method for forming self-curing concrete according to claim 1, wherein the cement-to-aggregate ratio is between 1:3 and 1:5 by weight.

9. A self-curing concrete formed using the method of claim 1.

10. A composition for forming concrete, the composition compromising cement, aggregate, water, and dry MIL-101 (Cr) metal organic framework (MOF),
    wherein the MIL-101(Cr) MOF is 3-9 wt. % relative to the cement, and wherein the water-to-cement ratio is between 0.4-0.6 by weight.

11. A composition for forming concrete as claimed in claim 1, wherein the cement to aggregate ratio is between 1:3 and 1:5 by weight.

\* \* \* \* \*